(12) United States Patent
Haas et al.

(10) Patent No.: US 9,441,519 B2
(45) Date of Patent: Sep. 13, 2016

(54) SYSTEM VARIATION ADAPTION FOR FEED-FORWARD CONTROLLER

(71) Applicant: Cummins, Inc., Columbus, IN (US)

(72) Inventors: Michael Haas, Columbus, IN (US); Phanindra V. Garimella, Bloomington, IN (US); Ming-Feng Hsieh, Nashville, IN (US)

(73) Assignee: Cummins Inc., Columbus, IN (US)

( * ) Notice: Subject to any disclaimer, the term of this patent is extended or adjusted under 35 U.S.C. 154(b) by 57 days.

(21) Appl. No.: 14/302,338

(22) Filed: Jun. 11, 2014

(65) Prior Publication Data

US 2015/0361846 A1  Dec. 17, 2015

(51) Int. Cl.
*F01N 3/00* (2006.01)
*F01N 3/20* (2006.01)
*F01N 9/00* (2006.01)

(52) U.S. Cl.
CPC .............. *F01N 3/208* (2013.01); *F01N 9/005* (2013.01); *F01N 2560/026* (2013.01); *F01N 2900/0404* (2013.01); *F01N 2900/0411* (2013.01); *F01N 2900/0601* (2013.01); *F01N 2900/1402* (2013.01); *F01N 2900/1411* (2013.01); *F01N 2900/1602* (2013.01); *F01N 2900/1621* (2013.01)

(58) Field of Classification Search
CPC ...... F01N 3/0842; F01N 13/02; F01N 9/002; F01N 3/035; F02D 41/0275; F02D 41/1441; F02D 41/0295; F02D 41/029
USPC .................... 60/285, 286, 295, 301; 701/108
See application file for complete search history.

(56) References Cited

U.S. PATENT DOCUMENTS

| | | |
|---|---|---|
| 7,093,427 B2 | 8/2006 | van Nieuwstadt et al. |
| 7,784,272 B2 | 8/2010 | Song et al. |
| 7,992,380 B2 | 8/2011 | Wei et al. |
| 8,145,329 B2 | 3/2012 | Pekar et al. |
| 8,225,595 B2 | 7/2012 | Garimella et al. |
| 8,256,208 B2 | 9/2012 | Wills et al. |
| 8,281,572 B2 | 10/2012 | Chi et al. |
| 8,281,578 B2 | 10/2012 | Upadhyay et al. |

(Continued)

OTHER PUBLICATIONS

ISA/US International Searching Authority International Search Report and Written Opinion, PCT Application No. PCT/US15/35277, dated Sep. 8, 2015, 8 pgs.

*Primary Examiner* — Patrick Maines
(74) *Attorney, Agent, or Firm* — Taft Stettinius & Hollister LLP

(57) ABSTRACT

Methods for adapting system variation for an engine system having an after-treatment system. Measured characteristics of the after-treatment system may be used to predict a model value(s) that is compared to a measured value(s) of the after-treatment system to provide a comparison value. Information relating to high frequency uncertainties in characteristics of the after-treatment system are removed from the comparison value to provide an estimated system variation value. The estimated system variation value may then be used to adapt a system command of a controller. Further, information relating to high frequency uncertainties in characteristics of the after-treatment system may be used by a feed-back controller to determine high frequency adaptation values that may also be used to adjust the system command. The inclusion of the estimated system variation may eliminate reliance on the feed-back controller to provide system adjustments for both high and low frequency uncertainties.

8 Claims, 5 Drawing Sheets

(56) References Cited

U.S. PATENT DOCUMENTS

| | | |
|---|---|---|
| 8,393,143 B2 | 3/2013 | Walz et al. |
| 8,463,531 B2 | 6/2013 | Ramappan et al. |
| 2009/0049827 A1* | 2/2009 | Wei .................... F01N 3/208 60/286 |
| 2009/0185954 A1* | 7/2009 | Qi ..................... F01N 3/208 422/62 |
| 2010/0024389 A1* | 2/2010 | Gady .................. B01D 53/30 60/274 |
| 2010/0050614 A1* | 3/2010 | Parmentier ............ F01N 3/208 60/287 |
| 2010/0083636 A1* | 4/2010 | Wang .................. F01N 3/2066 60/277 |
| 2011/0094209 A1* | 4/2011 | Charial ................ F01N 3/208 60/287 |
| 2011/0113753 A1* | 5/2011 | Christner ........... B01D 53/9409 60/274 |
| 2012/0017568 A1 | 1/2012 | Geveci et al. |
| 2012/0227383 A1* | 9/2012 | Charial ............... F01N 3/0231 60/274 |
| 2013/0104637 A1* | 5/2013 | Kowalkowski ....... F01N 3/2066 73/114.71 |
| 2013/0263575 A1* | 10/2013 | Sun .................... F01N 11/00 60/274 |
| 2013/0305695 A1 | 11/2013 | Henry et al. |
| 2015/0361845 A1* | 12/2015 | Garimella ............ F01N 3/208 60/274 |

\* cited by examiner

SYSTEM VARIATION ADAPTION FOR FEED-FORWARD CONTROLLER

BACKGROUND

Embodiments of the present invention generally relate to engine after-treatment control systems. More particularly, embodiments of the present invention relate to adapting a controller using an estimated after-treatment system variation.

Selective catalytic reduction (SCR) systems typically are configured to provide one or more catalyst elements that, with the aid of a reductant, covert nitrogen oxides ($NO_x$) in exhaust gases into nitrogen ($N_2$) and water. The reductant, such as, for example, ammonia ($NH_3$), may be injected into the exhaust gas upstream of the SCR catalyst. Typically, engine after-treatment systems attempt to inject a sufficient quantity of reductant into the exhaust gas necessary for the conversion of a predetermined amount of the $NO_x$ in the exhaust gas so as to prevent $NO_x$ slippage without incurring reductant slippage.

Numerous variable parameters affect the determination of the quantity of reductant that is to be injected into exhaust gases. Further, at least some of these variables may change during operation of the engine, such as, for example, due to changes in engine operating and/or environmental conditions. Additionally, at least some of these changes may occur relatively rapidly and/or be relatively short in duration, thereby allowing for a relatively short time period for the detection of such changes and to respond accordingly. Conversely, other changes, such as, for example, catalyst aging, may be more gradual, thereby requiring both monitoring over relatively long periods of time and adaptation strategies that are different than strategies that address variations that are more transient in nature. Further, the inability to accurately, and timely, detect and/or predict such shorter and longer term changes or variations may hinder the ability of the after-treatment system to relatively effectively treat $NO_x$ in exhaust gases, and thereby may increase the occurrence of $NO_x$ slippage or reductant slippage.

The operation of after-treatment systems is often controlled, at least in part, by controllers. Traditional controllers often have feed-back controllers to compensate for both high and low frequency variations or uncertainties in the after-treatment system. For example, the feed-back controller may receive a plurality of information relating to high frequency variations in characteristics of the engine system, including, for example, sensed, monitored, or predicted characteristics or conditions of the after-treatment system that have occurred or otherwise extend over relatively short periods of time, such as, for example, seconds or minutes. Additionally, the feed-back controller may also receive a plurality of information relating to low frequency variations in characteristics of the engine system, such as, for example, variations that reflect changes in the after-treatment system that have occurred over longer periods of time then the high frequency variations, such as, for example, variations that have occurred over the course of hours or days. Information pertaining to such low frequency variations may be more indicative of the performance of at least certain aspects of the after-treatment system than information reflecting high frequency variations.

As traditional feed-back controllers typically address both high and low frequency variations together, the control authority of feed-back controllers are typically limited, as they usually seek a balance between the impact adjustments on both high and low frequency variations. Such an attempt at attaining a balance between both high and low frequency variations may be implemented at least in part by limiting the control authority of the feed-back controller. But limitations on the control authority may adversely impact the accuracy of the information and/or commands provided by the feed-back controller. Additionally, the robustness of the feed-back controller may also be adversely impacted, as the feed-back controller is analyzing, addressing, and/or balancing both low and high frequency variations.

BRIEF SUMMARY

An aspect of the present invention is a method for adapting system variation for an engine system having an after-treatment system that includes measuring at least one operation value. The method also includes determining a model value that is based on the measured operation value(s), and comparing the model value to a measured value to determine a comparison value. Additionally, information relating to high frequency variations in characteristics of the engine system are removed from the comparison value to provide an estimated system variation value. Further, a system command is determined based at least in part on information relating to high frequency variations in characteristics of the engine system. The method also includes adjusting the system command using the estimated system variation value.

Another aspect of the present invention is a method for adapting system variation for an engine system having an after-treatment system that includes measuring a first set of operation values of the after-treatment system and predicting, using a feed-forward model, and based on at least the first set of operation values, a model value. The method also includes determining a measured value based on at least a portion of the first set of operation values, and comparing, by a comparator, the model value to the measured value to determine a comparison value. High frequency variations in characteristics of the after-treatment system are removed from the comparison value by a low pass filter to provide an estimated system variation value. Additionally, a feed-forward controller determines, based at least in part on a second set of operation values of the after-treatment system, a system command. The method further includes adjusting the system command using the estimated system variation value.

Additionally, another aspect of the present invention is a method for adapting system variation for an engine system having an after-treatment system that includes both predicting a model SCR efficiency value and determining a measured SCR conversion efficiency. The model SCR efficiency value is compared to the measured SCR conversion efficiency to attain a comparison value. Information of high frequency variations of characteristics of the after-treatment system are removed from the comparison value to provide an estimated system variation value. The method further includes predicting a dosing command for the after-treatment system and adjusting the dosing command using the estimated system variation value.

Other aspects of the present invention will become apparent by consideration of the detailed description and accompanying drawings.

Figure 1:
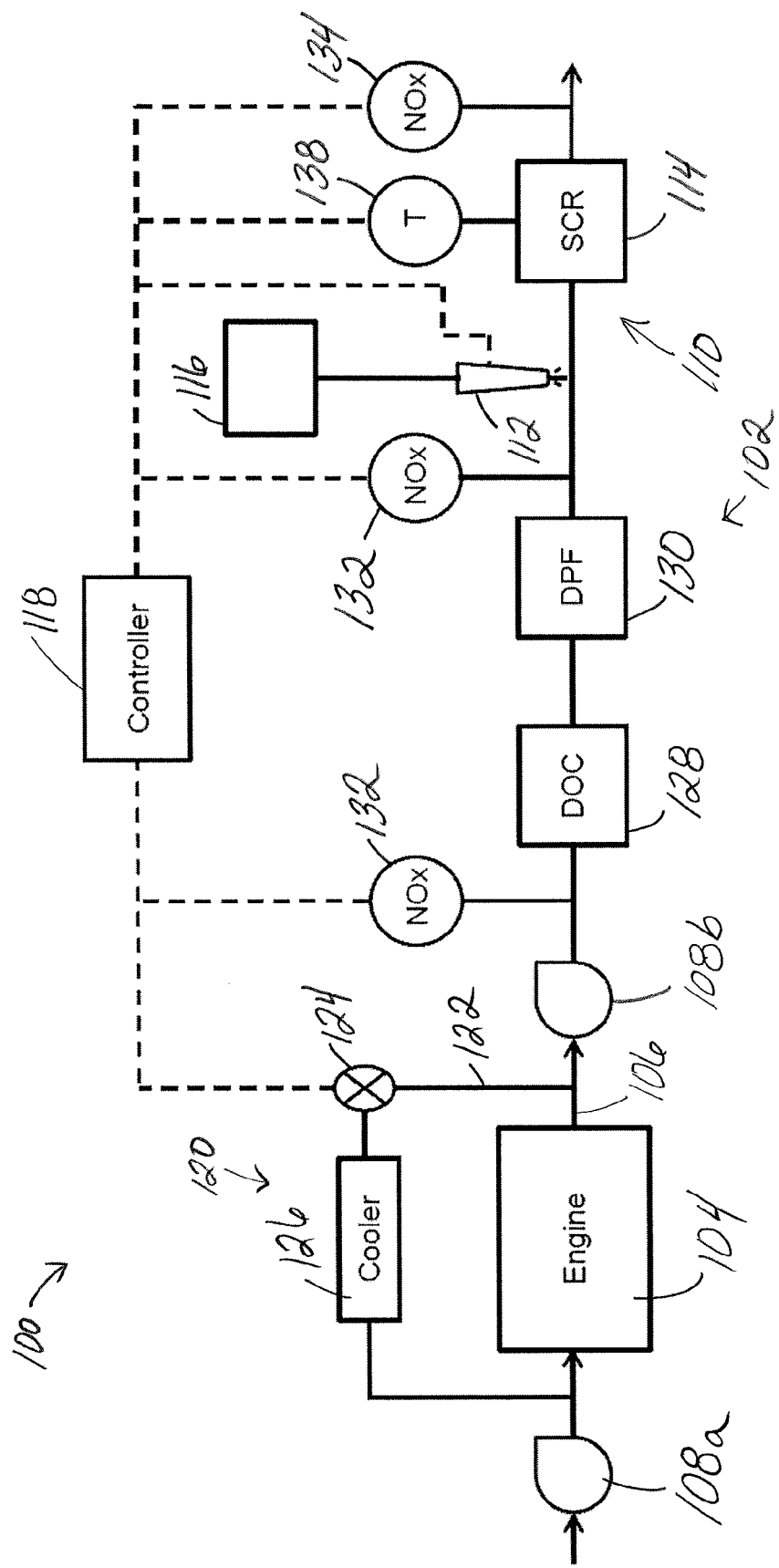
FIG. 1 illustrates a schematic block diagram of an engine system having an exhaust gas after-treatment system.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

FIG. 1 illustrates a schematic block diagram of an engine system 100 having an exhaust gas after-treatment system 102. The engine system 100 includes an engine 104, such as, for example, a combustion engine, including, but not limited to, a diesel, gasoline, natural gas, and/or combined fuel engine. Operation of the engine 104 generates an exhaust stream 106 that has an amount of $NO_x$ as a constituent therein. Optionally, according to certain embodiments, the engine system 100 includes a turbocharger having a turbine side 108a on an intake side of the engine 104, and a compressor side 108b on an exhaust side of the engine 104.

The after-treatment system 102 includes a selective catalyst reduction (SCR) system 110. According to certain embodiments, the SCR system 110 includes a reductant injector or doser 112 and an SCR catalyst component 114. The reductant injector 112 is in fluid communication with a reductant source 116, and is controllable by a controller 118. The reductant source 116 may contain a reductant such as, for example, ammonia ($NH_3$), urea, and/or a hydrocarbon, that is supplied for injection by the reductant injector 112 into the exhaust stream 106 at a position upstream of the SCR catalyst component 114. The controller 118 may be configured to both determine a ratio of reductant to $NO_x$ in the exhaust stream, such as, for example, an ammonia to $NO_x$ ratio (ANR) during operation of the engine, and to adjust the operation of the reductant injector 112 to achieve a target reductant to $NO_x$ ratio. Additionally, the SCR catalyst component 114 is configured to provide an SCR catalyst that at least assists in the reductant reacting with $NO_x$ in the exhaust gas to reduce the amount of $NO_x$ in the exhaust stream 106.

Optionally, the after-treatment system 102 may include additional after-treatment components, including, but not limited to, an exhaust gas recirculation (EGR) system 120, a oxidation catalyst (DOC) 128, and/or a particulate filter, such as, for example, a diesel particulate filter (DPF) 130. For example, as shown in FIG. 1, according to certain embodiments, the after-treatment system 102 may include an EGR system 120 that has an exhaust flow path 122 that delivers a portion of the exhaust stream 106 to an intake side of the engine 104, and which includes an EGR valve 124 and an EGR cooler 126.

According to certain embodiments, the after-treatment system 102 includes at least one engine-out $NO_x$ sensor 132 that is used in detecting an $NO_x$ level in the exhaust stream 106 upstream of the SCR system 110. In the illustrated embodiment, one or more engine-out $NO_x$ sensors 132 may be positioned upstream of the DOC 128, the particulate filter 130, and/or the reductant injector 112. Further, according to the illustrated embodiment, the engine-out $NO_x$ sensor 132 may provide a signal for the controller 118 that indicates, and/or is used in determining, a level of $NO_x$ in the exhaust gas at a location upstream of the reductant injector 112. Alternatively, the quantity of engine-out $NO_x$ may be modeled, calculated from an engine operation map, and/or measured from a different location than the location of the engine-out $NO_x$ sensors 132 shown in FIG. 1.

The after-treatment system 102 may also include at least one system-out $NO_x$ sensor 134 that is positioned downstream of the SCR catalyst component 114. The system-out $NO_x$ sensor 134 may be used in determining the quantity of $NO_x$ that is being released from the engine system 100, such as, for example, the amount of $NO_x$ that is being released from the engine system 100 via a tailpipe. Additionally, the engine-out and system-out $NO_x$ sensors 132, 134 employed by the after-treatment system 102 need not be of the same type or capability. Further, the engine system 100 may include additional $NO_x$ sensors positioned at other locations throughout the engine system 100 and/or the after-treatment system 102 that provide information that indicates, or otherwise is used to determine, $NO_x$ levels in the exhaust stream 106.

The after-treatment system 102 may also include at least one temperature sensor 138 that is in communication with the controller 118. According to certain embodiments, the temperature sensor 138 can be used to determine a temperature of the SCR catalyst component 114, and more specifically, the temperature of the SCR catalyst that is within the SCR catalyst component 114. According to certain embodiments, the temperature sensor 138 is positioned within the SCR catalyst component 114. Alternatively, the temperature sensor 138 is positioned upstream and/or downstream of the SCR catalyst component 114. Further, the temperature of the SCR catalyst component 114 may be determined in a variety of different manners, including, for example, at least by utilizing a weighted average of temperature sensors 138 that are positioned upstream and downstream of the SCR catalyst component 114, or modeling and/or estimating the temperature of the SCR catalyst component 114 based upon other temperature measurements available in the engine system 100, and more specifically within the after-treatment system 102.

According to the illustrated embodiment, the controller 118 is structured to functionally execute operations to control the after-treatment system 102, and in particular, at least the SCR system 110. Further, the controller 118 may include a number of modules structured to functionally execute the operations of the controller 118. For example, an exemplary controller 118 includes a system conditions module, a $NO_x$ modeling module, a $NO_x$ reference module, a $NO_x$ error determination module, a $NO_x$ control module, and/or a doser control determination module. In certain embodiments, the controller 118 forms a portion of a processing subsystem including one or more computing devices having memory, processing, and communication hardware. The controller 118 may be a single device or a distributed device, and the functions of the controller 118 may be performed by hardware or software.

The description herein including modules emphasizes the structural independence of the aspects of the controller 118, and illustrates one grouping of operations and responsibilities of the controller 118. Other groupings that execute similar overall operations are understood within the scope of the present application. Additionally, modules may be implemented in hardware and/or software on computer readable medium, and modules may be distributed across various hardware or software components.

Figure 2:
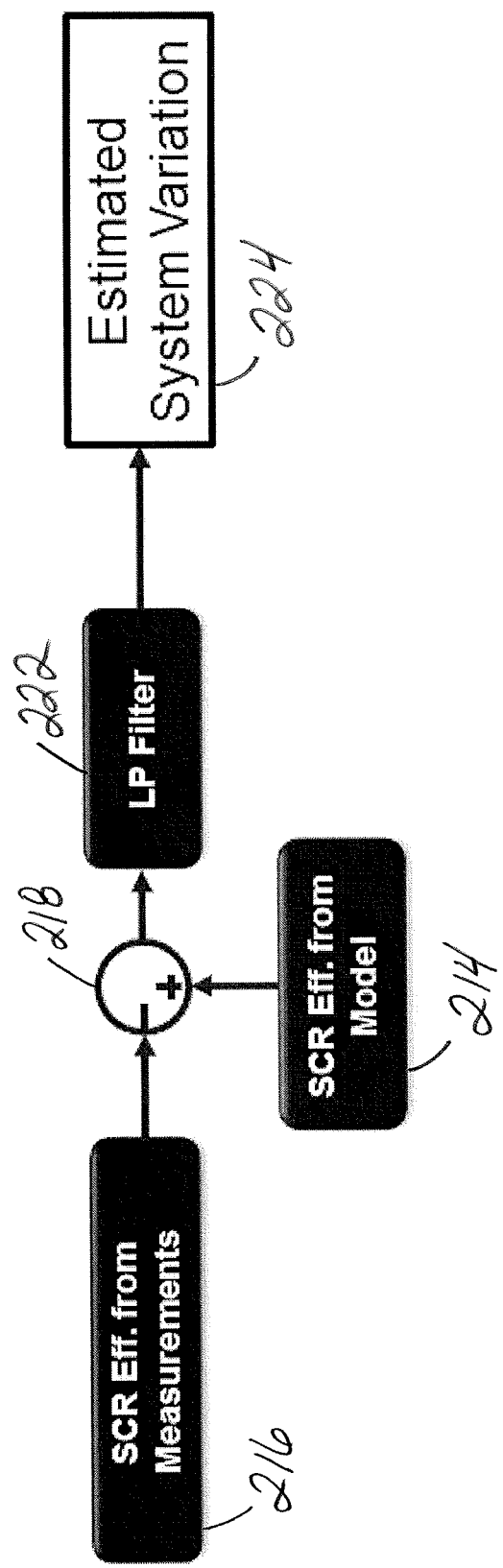
FIG. 2 illustrates a schematic block diagram of a control system for estimating a low frequency system variation from a comparison of system output measurements and a system output model according to an illustrated embodiment of the present invention.
Figure 3:
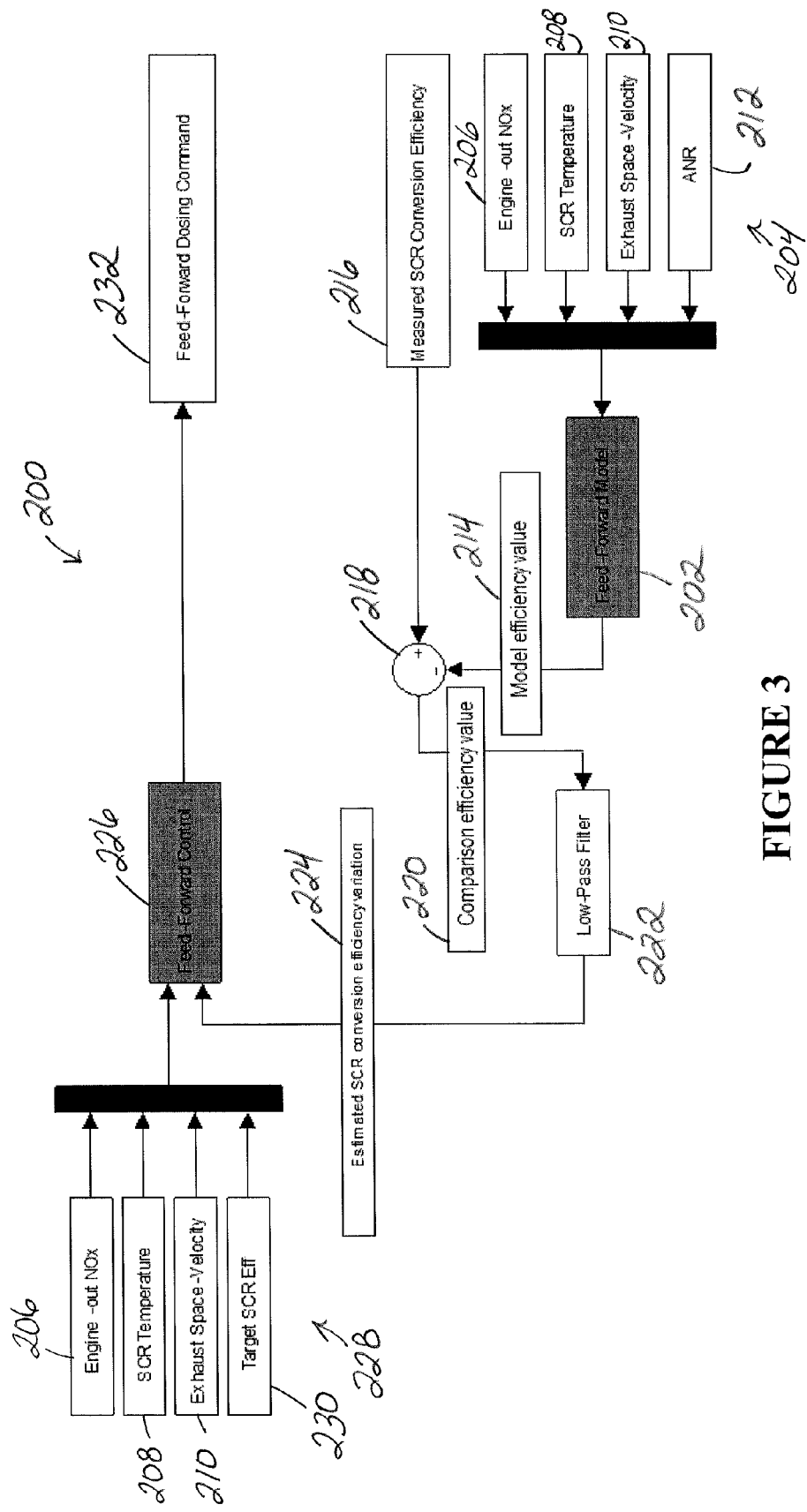
FIG. 3 is a schematic diagram depicting an exemplary control system for low frequency variations that provides an estimated SCR conversion efficiency variation value for feed-forward command adjustment according to an illustrated embodiment of the present invention.

Referencing FIGS. 1-3, according to certain embodiments, the controller 118 may include a low frequency variation control system 200 that provides an estimated system variation value 224 that is derived, at least in part by, comparing, via a comparator 218, one or more system outputs as predicted by a model(s), also referred to as model values 214, and one or more system output measured values 216. According to certain embodiments, the estimated system variation value 224 may be a lumped system variation that changes relatively slowly over time. For example, according to certain embodiments, the estimated system variation value 224 may be a combination of different variation sources, such as, for example, catalyst aging, sulfur poisoning, and/or doser aging/drifting, among other variation sources. Additionally, according to certain embodiments, the estimated system variation value 224 is provided to a feed-forward controller 226. By providing the estimated system variation value 224 to the feed-forward controller 226, the associated analysis of information relating to low frequency variations used to derived the system variation value 224 does not need to be performed by a feed-back controller, such as, for example, by the feed-back controller 408 shown in FIGS. 4 and 5, as discussed below.

In the illustrated embodiment discussed herein, the estimated system variation value 224 and associated operation values 204, 228 are discussed in terms of estimating a system variation relating to the SCR system 110, with the estimated system variation value 224 being an estimated SCR conversion efficiency variation value. However, embodiments of the present invention are readily adaptable for system variations relating to a variety of other system output measurements and models. Additionally, the estimated system variation value 224 discussed herein may not only be used for feed-forward adaption, but may also be used by on-board diagnostic (OBD) systems. Moreover, the estimated system variation value 224 may be used by the OBD, or other diagnostic systems, to evaluate system changes, such as, for example, by comparing the estimated system variation value 224 to a nominal variation. For example, according to certain embodiments, the estimated system variation value 224 may be based on different temperature zones and provide information relating to a determination of whether a catalyst is sulfur poisoned, as sulfur poisoned catalysts have degraded conversion efficiencies at lower catalyst temperatures. Thus, according to certain embodiments, the OBD may compare the estimated system variation value 224 to the nominal value to determine whether the catalyst is sulfur poisoned.

Referencing FIG. 3, according to certain embodiments, the low frequency variation control system 200 includes a feed-forward model 202 that derives a model value 214. In the illustrated embodiment, the model value 214 is a model SCR conversion efficiency value that reflects the predicted efficiency of the SCR system 110 and/or SCR catalyst component 114 in removing $NO_x$ from the exhaust stream 106. The model conversion efficiency value 214 may be, at least in part, based on a first set of operation values 204 in the after-treatment system 102. The first set of operation values 204 utilizes one or more measured, sensed, predicted, or estimated values, including, for example, an engine $NO_x$ output value 206, an SCR catalyst temperature 208, an exhaust gas space velocity value 210 for exhaust gas traveling through the after-treatment system 102, and/or a reductant to $NO_x$ ratio 212, such as, for example, an ammonia to $NO_x$ ratio (ANR), among other operation values. In the illustrated embodiment, the engine $NO_x$ output value 206 may be attained through use of an $NO_x$ sensor 134 that is positioned downstream of the SCR catalyst component 114, while the SCR catalyst temperature 208 may be attained using a temperature sensor 138 that is within the SCR catalyst component 114. The exhaust gas space velocity value 206 may be a volumetric flow rate of the exhaust gas that can be calculated in a variety of different manners, including, for example, using an intake air flow mass of the engine 104 as measured by an air flow sensor and a volume of the SCR catalyst. Additionally, the exhaust gas space velocity value 206 may be in any units understood in the art, including, without limitation, exhaust mass flow or exhaust volumetric flow per unit of catalyst mass or catalyst bed volume. According to certain embodiments, the feed-forward model 202 may determine the model value 214 using a variety of different look-up tables and/or models, as well as the first set of operation values 204, and other known or predicted values.

The controller 118 may also be adapted to use one or more of the operation values to determine a measured value 216, such as, for example, a measured SCR conversion efficiency value. The measured SCR conversion efficiency value may be derived in a number of different manners, including, for example, a comparison of the engine $NO_x$ output value 206, as detected by an engine-out sensor $NO_x$ 132, to a system $NO_x$ output value, which may be measured downstream of the SCR system 110, such as, for example, by the system-out $NO_x$ sensor 134. The measured SCR conversion efficiency value may then be determined, for example, by a formula of 1 less the ratio of the system-out $NO_x$ value to the engine $NO_x$ output value 206.

The controller 118 is configured to compare the model value 214 and the measured value 216. For example, according to the illustrated embodiment, the model conversion efficiency value and the measured conversion efficiency value may be compared using a comparator 218. The comparator 218 may output a comparison value 220 that indicates the difference between the model and measured values 214, 216. For example, the comparison value 218 may indicate the difference of the ideal SCR conversion efficiency, as provided by the model value 214, and the derived actual SCR conversion efficiency, as provided by the measured value 216.

The comparison value 220 provided by the comparator 218 may be provided to a low pass filter 222 that is configured to remove noise associated with high frequency variations in characteristics of the engine system 100 from the comparison value 220. Moreover, the low pass filter 222 may remove information pertaining to high frequency variations that are not used in deriving an estimated system variation value 224, including, for example, readings, measurements, or values for the first set of operation values 204 that cover relatively short periods or durations of time. Thus, information reflecting measurements that are repeatedly being taken over short intervals of time may be considered noise with respect to evaluating low frequency variations in the SCR system 110. For example, in the illustrated embodiment, the low pass filter 222 may remove information relating to high frequency variations in the characteristics of the after-treatment system 102, such as engine $NO_x$ output values 206 that correspond to measurements that are repeatedly being taken at over the course of few seconds or minutes, and instead utilize information that reflects $NO_x$ output values 206 over a longer time period, such as, for example, minutes, hours, and days, among other time periods. However, the time duration considered for low and high frequency variations may alter depending on variation source, and moreover, the type of variation being reflected in the high and low frequency variations.

Following removal of information pertaining to high frequency variations, according to certain embodiments, the low pass filter 222 may provide the estimated system variation value 224 to the feed-forward controller 226. The estimated system variation value 224 may be a single estimated system variation value 224 or multiple estimated system variation values 224. For example, the estimated system variation value 224 may include multiple estimated system variation values 224 that are based on different operating conditions, such as, for example, different temperature zones. In the illustrated embodiment, by providing multiple estimated system variation values 224, a more accurate value for estimated SCR conversion efficiency variation may be utilized by the feed-forward controller 226.

The feed-forward controller 226 also receives a second set of operation values 228. According to certain embodiments, one or more of the operation values 206, 208, 210, 212, 230 may be the same for both the first and second sets of operation values 204, 228. For example, in the illustrated embodiment, the set of operation values 228 received by the feed-forward controller 226 is the same as the set of operation values 204 received by the feed-forward model 202 with the exception that, in the illustrated embodiment, rather than receiving a reductant to $NO_x$ ratio 212, as provided to the feed-forward model 202, the feed-forward controller 226 receives a target SCR efficiency value 230. Additionally, like the first set of operation values 204, the second set of operation values 228 may include information relating to high frequency variations in characteristics of the engine system 100, and more specifically, in the after-treatment system 102.

The feed-forward controller 226 is configured to utilize the second set of operation values 228 with look-up tables and/or models to determine a system command 232, such as, for example, a dosing command for the reductant injector 112 that controls the quantity and/or timing of reductant that is injected into the exhaust stream 106 by the reductant injector 112. Further, according to certain embodiments, information provided by the estimated system variation value 224 is used by the feed-forward controller 226 to make adjustments, if necessary, to the system command 232.

Figure 4:
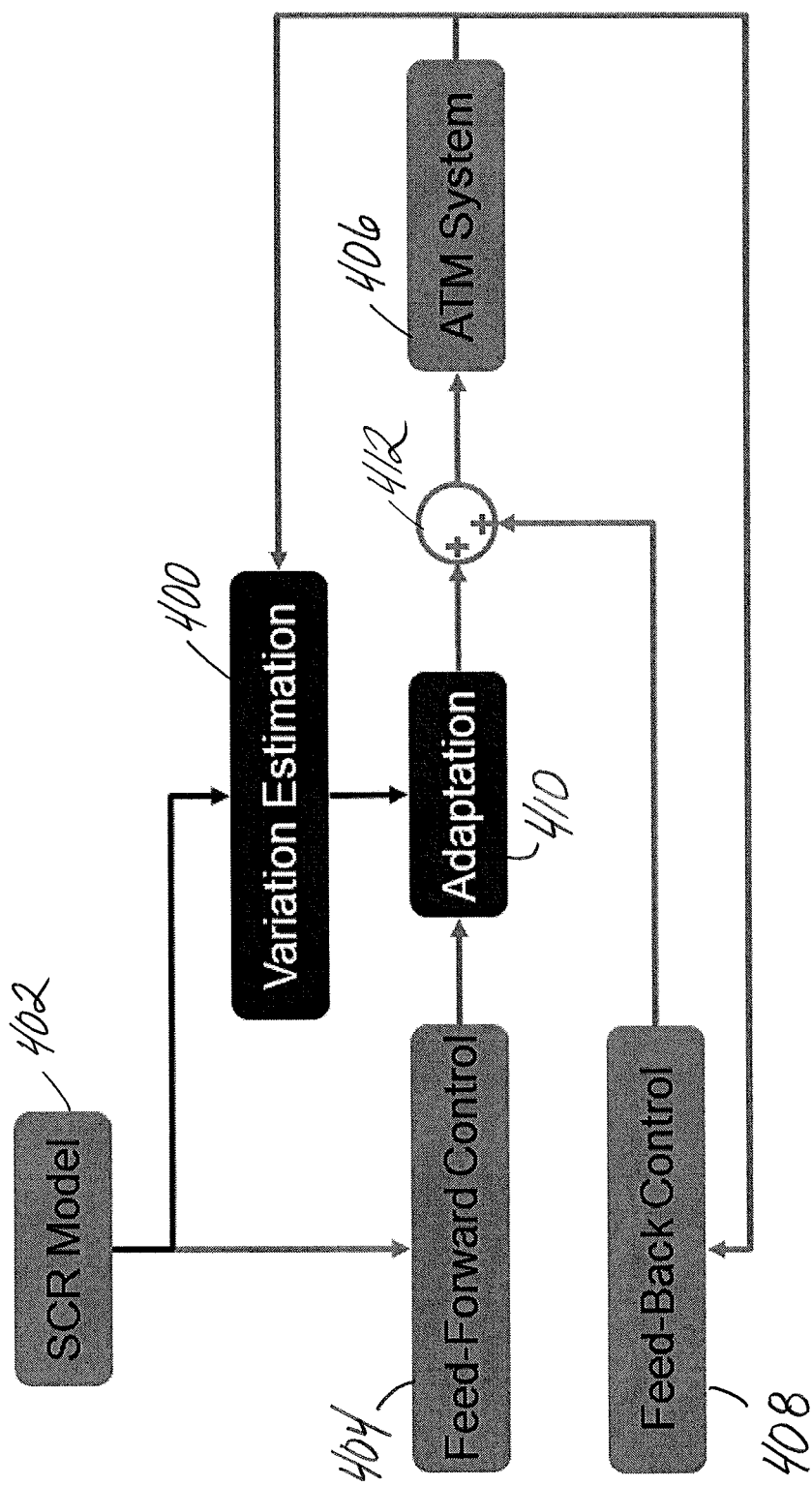
FIG. 4 illustrates a schematic diagram of a control system in which an adaption result reflecting an estimated system variation is provided to update the feed-forward controller portion of a controller according to an illustrated embodiment of the present invention.
Figure 5:
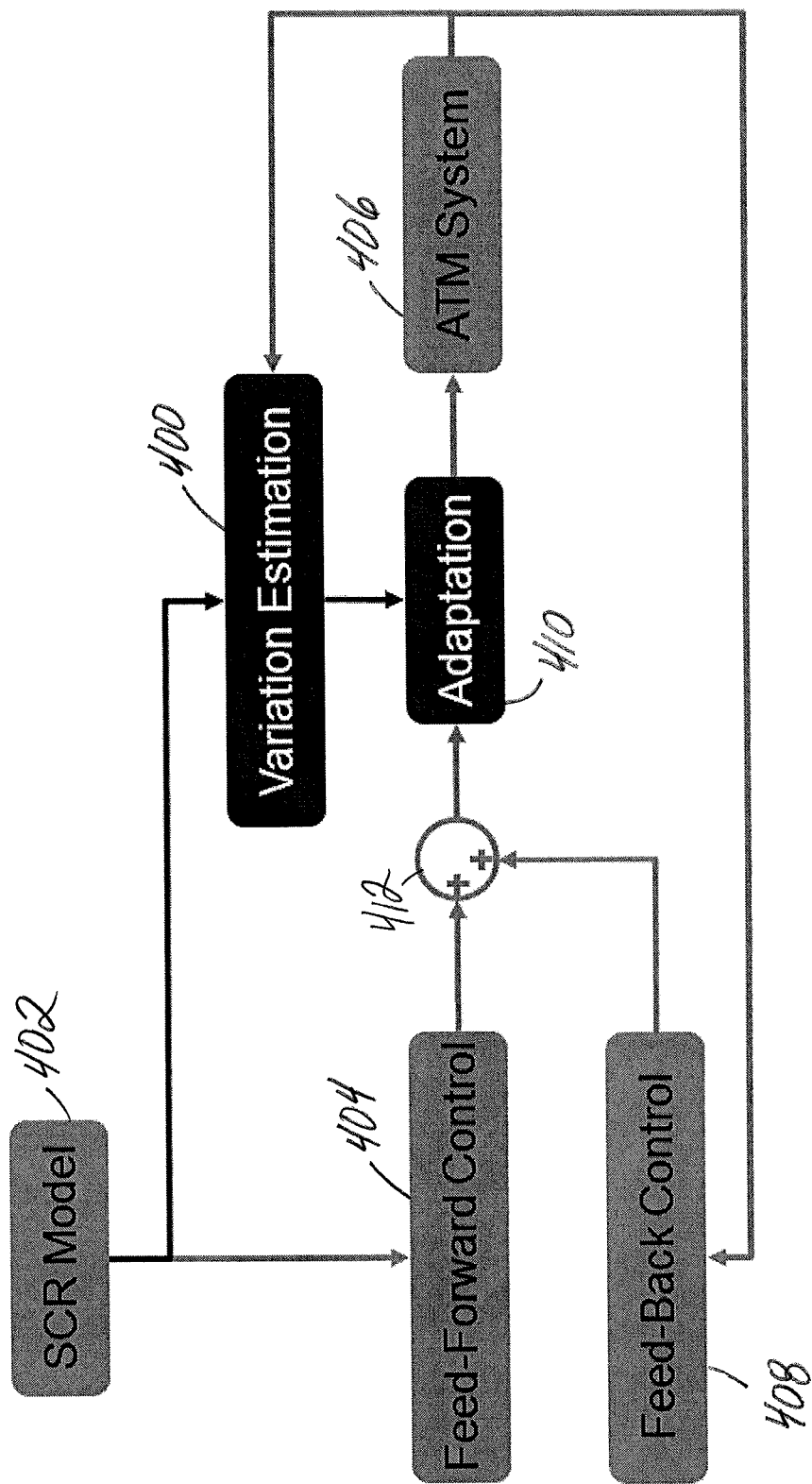
FIG. 5 illustrates a schematic diagram of a control system in which an adaption result reflecting an estimated system variation value is provided to update an output of a controller according to an illustrated embodiment of the present invention.

The adaption provided through use of the estimated system variation value 224 may be achieved in a variety of different manners. For example, as described with respect to FIG. 3, and as shown in FIG. 4, the estimated system variation value 224, 400 may be used to update the feed-forward controller 226. For example, as shown in FIG. 4, an SCR model 402 may provide one or more system output model values, such as, for example, a model predicting an SCR conversion efficiency based on one or more operating parameters 204 as shown in FIG. 3, to both a feed-forward controller 404 and for use in determining the estimated system variation value 400. Measured operation values 216 may also be provided for the estimated system variation value 400 from the after-treatment system 406, such as, for example, a measured SCR conversion efficiency value, as discussed above and shown in FIG. 3.

In the illustrated embodiment, information provided to, or otherwise obtained for, the estimated system variation value 400 may be provided to a comparator and low pass filter, such as, for example, the comparator 218 and low pass filter 222 discussed with respect to FIG. 3. The estimated system variation value 400 may then be applied to the feed-forward controller 404 so as to attain an adaption result 410, such as, for example, an adjusted or updated command or model that was provided by the feed-forward controller 404. For example, according to certain embodiments, the adaption result 410 may be an adjusted or updated dosing command.

Additionally, the after-treatment system 406 may also provide measured information to a feed-back controller 408. The feed-back controller 408 may be configured to determine high frequency adaptation values that provide adjustments to system commands, such as, for example, commands related to the operation of the after-treatment system, including dosing commands. Moreover, in the illustrated embodiments, as low frequency adjustments are addressed by the estimated system variation value 400, the feed-back controller 408 may be configured to address high frequency variations in characteristics of the engine system 100, and more specifically in the after-treatment system 102, rather than addressing both high and low frequency variations in the engine system 100. Thus, the control authority of the feed-back controller 408 may be configured for controlling system variations that address high frequency variations, rather than attempting to attain a balance between the control of both high and low frequency variations. Therefore, the feed-back controller 408 may have more authority to compensate for high frequency variations or uncertainty in operation values, which may allow for improved accuracy of the adjustments for high frequency variations by the feed-back controller 408 and low frequency variations through the use of the estimated system variation value 400. Further, such adjustments in the control authority may allow for the feed-back controller 408 to be more robust in providing high frequency adjustments relating to the operation of the after-treatment system 102, while the controller 118 may be more robust in adapting to large low frequency variations, such as, for example, in making adjustments related to catalyst aging, sulfur poisoning, and/or doser aging/drifting, among other types of low frequency variations.

In the embodiment shown in FIG. 4, the adaption value 410 and model or predicated information from the feed-back controller 408 is provided to a feed-back module 412 to attain a final system output command that is used for the operation of the after-treatment system 406. According to certain embodiments, the feed-back module 412 may perform a summation operation using the adaption result 410 and the model provided by the feed-back controller 408. Alternatively, referencing FIG. 5, rather than updating the command of the feed-forward controller 404, the adaptation result 410 may update the output from the feed-back module 412 to provide a final system output command of the controller 118.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages. While the present invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for adapting system variation for an engine system having an after-treatment system including an SCR catalyst and a reductant injector, the method comprising:
    predicting a model SCR efficiency value;
    determining a measured SCR conversion efficiency;
    comparing the model SCR efficiency value to the measured SCR conversion efficiency to attain a comparison value, the comparison value including information relating to first frequency variations and second frequency variations in characteristics of the after-treatment system, the second frequency variations extending over a longer time duration than the first frequency variations:
    removing from the comparison value information of first frequency variations of characteristics of the after-treatment system to provide an estimated system variation value;
    predicting a dosing command for the after-treatment system, the predicted dosing command being based, at least in part, on first frequency variations in the after-treatment system;
    adjusting the dosing command using the estimated system variation value; and
    adjusting, based on the adjusted dosing command, a quantity of reductant released from the reductant injector of the after-treatment system.

2. The method of claim 1, wherein first frequency variations include information relating to one or more of the following: engine NOx output value, SCR catalyst temperature, exhaust gas space velocity value, and a target SCR efficiency value.

3. The method of claim 1, further including the step of determining, the measured SCR conversion efficiency based, at least in part, on the at least one operation value.

4. The method of claim 1, further including the step of providing the estimated system variation value to a feed-forward controller, and wherein the step of adjusting the system command is performed by the feed-forward controller.

5. The method of claim 1, further including the steps of comparing the estimated system variation value to a related, nominal value, and determining changes, if any, in the after-treatment system based on the comparison of the estimated system variation value to the nominal value.

6. The method of claim 1, wherein the step of adjusting the dosing command comprises adapting a system command from a feed-forward controller using the estimated system variation value.

7. The method of claim 6, further including the step of predicting, by a feed-back controller, a first frequency adaptation value for the dosing command using information relating to first, but not second, frequency variations of characteristics of the after-treatment system.

8. The method of claim 7, wherein at least some of the first frequency variations that are removed from the comparison value information are different than first frequency variations that the predicted dosing command is at least in part, based on.

* * * * *